United States Patent
Maeda et al.

(10) Patent No.: US 9,279,827 B2
(45) Date of Patent: Mar. 8, 2016

(54) SENSOR MODULE AND SENSOR SYSTEM

(75) Inventors: Daisuke Maeda, Kokubunji (JP);
Heewon Jeong, Tokyo (JP); Masahide Hayashi, Mito (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 385 days.

(21) Appl. No.: 13/976,372

(22) PCT Filed: Nov. 24, 2011

(86) PCT No.: PCT/JP2011/077070
§ 371 (c)(1),
(2), (4) Date: Aug. 9, 2013

(87) PCT Pub. No.: WO2012/090627
PCT Pub. Date: Jul. 5, 2012

(65) Prior Publication Data
US 2013/0319075 A1   Dec. 5, 2013

(30) Foreign Application Priority Data
Dec. 27, 2010   (JP) .................................. 2010-291015

(51) Int. Cl.
*G01P 21/00* (2006.01)
*G01C 19/5776* (2012.01)
*G01C 21/16* (2006.01)

(52) U.S. Cl.
CPC ............ *G01P 21/00* (2013.01); *G01C 19/5776* (2013.01); *G01C 21/16* (2013.01)

(58) Field of Classification Search
None
See application file for complete search history.

(56) References Cited

U.S. PATENT DOCUMENTS

| 7,624,636 B2 | 12/2009 | Bolzmann et al. |
| 2005/0216149 A1 | 9/2005 | Kato |
| 2005/0217375 A1 | 10/2005 | Mase |
| 2005/0222743 A1 | 10/2005 | Otsuka |

FOREIGN PATENT DOCUMENTS

| DE | 10 2005 013 554 A1 | 10/2005 |
| DE | 10 2005 014 500 A1 | 10/2005 |
| DE | 10 2005 014 501 A1 | 10/2005 |
| DE | 10 2007 011 816 A1 | 9/2008 |

(Continued)

OTHER PUBLICATIONS

Corresponding International Search Report with English Translation dated Dec. 27, 2011 (five (5) pages).

(Continued)

*Primary Examiner* — Robert R Raevis
(74) *Attorney, Agent, or Firm* — Crowell & Moring LLP

(57) ABSTRACT

Reliability and accuracy of a sensor are secured while adjustment cost of a sensor module is suppressed. A signal component analysis part 10 receives a signal output from a signal processing part 7 before passing through a low-pass filter 8, analyzes whether or not application of a fragile frequency with respect to a physical quantity is equal to or more than a threshold level, if the application of the fragile frequency is equal to or more than the threshold level, outputs output stop signals to output signal control parts 9, 16. The output signal control parts 9, 16 receive control signals output from the signal component analysis part 10, and outputs an acceleration signal and a physical quantity signal from which noise has been removed by the low-pass filters 8, 15 through the signal processing parts 7, 14.

16 Claims, 9 Drawing Sheets

(56) References Cited

FOREIGN PATENT DOCUMENTS

| JP | 61-191171 A | 8/1986 |
|---|---|---|
| JP | 2005-241359 A | 9/2005 |
| JP | 2007-187606 A | 7/2007 |
| JP | 2007-532932 A | 11/2007 |
| JP | 2008-256668 A | 10/2008 |

OTHER PUBLICATIONS

German Office Action dated Feb. 10, 2015, with English translation (Seventeen (17) pages).

SENSOR MODULE AND SENSOR SYSTEM

TECHNICAL FIELD

This invention relates to a measurement technology for sensors of detecting various physical quantities, and specifically, to a technology effective for prevention of abnormal value output and fault misdiagnosis of sensors having frequency split bands with respect to input physical quantities.

BACKGROUND ART

Among sensors for measuring and converting physical quantities into electrical signals such as inertial quantity sensors and pressure sensors, in sensors on the detection principle of mechanical displacement, generally, a behavior (vibration mode) different from the steady state is generated by application of vibration at a frequency related to the natural frequency of the mechanical part.

Accordingly, the frequency related to the natural frequency is called a frequency split, and it is important for reliability improvement of the sensors to make robust designs with respect to the vibration application at the frequency.

For example, among angular velocity sensors, one using the so-called Coriolis effect as its principle generally has a configuration of vibrating a mass at a resonance frequency in a drive direction and, when an angular velocity is applied to the mass, detecting a Coriolis force generated in the direction orthogonal to the drive direction from displacement of the mass, and outputting it as an electrical signal. The difference between the resonance frequency in the drive direction and the resonance frequency in the detection direction is the frequency split.

In the above described angular velocity sensor using the principle of the Coriolis effect, it is known that the displacement of the mass in the detection direction becomes larger than the displacement at application of the angular velocity to the band lower than the frequency split, i.e., the band necessary as the sensor by the angular velocity application near the frequency split, and it may be possible that the fault misdiagnosis of the self-diagnosis function of the sensor may be caused by the saturation of signals within a circuit and signal levels outside of the normal range.

FIG. 9 shows open circuit output characteristics with respect to an input angular velocity frequency of an angular velocity sensor without the frequency split (i.e., the resonance frequency in the drive direction and the resonance frequency in the detection direction are equal), and FIG. 10 shows the same with the frequency split at about 500 Hz.

In the case of the angular velocity sensor without the frequency split shown in FIG. 9, its output exhibits a same signal strength characteristic to a certain frequency and the gain becomes lower at the higher frequencies. On the other hand, the angular velocity sensor with the frequency split shown in FIG. 10 exhibits a frequency characteristic having a peak in the frequency split band. This is because the sum of the frequency of the applied angular velocity and the frequency in the drive direction becomes closer to the resonance frequency in the detection direction.

The resonance frequency in the drive direction and the resonance frequency in the detection direction are made equal, and thereby, the frequency split is eliminated, and, as a technology for solving the problem, a technology of changing the resonance frequency in the detection direction by applying a force in a direct current to the mass in the detection direction has been generally known.

Further, in the type of angular velocity sensor, as a technology for preventing output of the signal in the frequency split band with the larger gain, for example, a technology of series-connecting a Butterworth filter and a Chebyshev filter as a filter configuration of reducing only the gain of the frequency split while maintaining the gain in the desired band of the sensor has been known (see Patent Document 1).

CITATION LIST

Patent Literature

PTL 1: JP 2008-256668 A

SUMMARY OF INVENTION

Technical Problems

However, in the above described frequency split adjustment technologies in the angular velocity sensors, the inventors have found that there are the following problems.

For example, in the configuration of applying the force in the direct current to the mass in the detection direction for elimination of the frequency split of the angular velocity sensor, for adjustment of the frequency split having individual variability, it has been necessary to individually measure the frequency split with respect to each sensor and set a value of an applied voltage. Accordingly, there has been a problem that lots of adjustment cost is caused for adjustment of the frequency split varying among the individual sensors. Further, it is necessary to maintain it in the entire period for using the sensor, and thus, there has been a problem that the higher cost is necessary for adjustment and performance maintenance of the sensor.

In addition, in the technology of mounting the filter configuration for reducing only the gain in the frequency split band while maintaining the gain of the desired band of the sensor, the abnormal value output and fault misdiagnosis due to signal saturation at the upstream of the filter may occur and the reliability may be lowered.

On the other hand, in the case where the signal maximum value of the circuit is made equal to the signal strength when the frequency split is generated for suppression of the occurrence of saturation, the resolution in the band originally desired as the sensor, the so-called dynamic range may be deteriorated and the accuracy of the sensor may be lowered. That is, in the configuration, trade-off between securement of reliability and accuracy as the sensor holds.

An object of the invention is to provide a technology that may secure reliability and accuracy of a sensor while suppressing adjustment cost of the sensor.

The above described and other objects and novel features of the invention will be clear from the description of the specification and the accompanying drawings.

Solution to Problems

Of the inventions disclosed in this application, the summaries of the representatives will be explained as below.

The invention has a first detection element that detects acceleration from outside, an acceleration signal processing unit that processes an acceleration signal detected by the first detection element, a first filter that removes a noise from the signal processed by the acceleration signal processing unit, a second detection element that detects another physical quantity than acceleration, a first physical quantity signal processing unit that processes a physical quantity signal detected by the second detection element, a second filter that removes a noise from the signal processed by the first physical quantity signal processing unit, a signal component analysis unit that analyzes a frequency component of the signal processed by the acceleration signal processing unit, determines whether or not a physical quantity having a frequency split component representing a difference between a frequency in a drive direction of the second detection element and a frequency in a detection direction of the second detection element is applied, and, if determining that the physical quantity having the frequency split component is applied, outputs an output stop signal, a first output control unit that stops output of the signal output from the first filter when the output stop signal is output from the signal component analysis unit, and a second output control unit that stops output of the signal output from the second filter when the output stop signal is output from the signal component analysis unit.

Further, according to the invention, the first and the second output control units output flags representing that the signal output is stopped when the output stop signal is output from the signal component analysis unit.

Furthermore, according to the invention, the physical quantity detected by the second detection element is an angular velocity.

In addition, according to the invention, the acceleration signal processing unit, the first and the second filters, the signal component analysis unit, the first and the second output control units, and the first physical quantity signal processing unit are formed on one semiconductor chip.

Further, the invention further has a third detection element that detects another physical quantity than acceleration, a second physical quantity signal processing unit that processes a physical quantity signal detected by the third detection element, a third filter that removes a noise from the signal processed by the second physical quantity signal processing unit, and a third output control unit that stops output of the signal output from the third filter when the output stop signal is output from the signal component analysis unit.

Furthermore, the invention has a first semiconductor chip on which the acceleration signal processing unit, the first filter, the first output control unit, and the signal component analysis unit are formed, and a second semiconductor chip on which the first physical quantity signal processing unit, the second filter, and the second output control unit are formed, wherein the first semiconductor chip is connected to the second semiconductor chip by a bonding wire, and transmits the output stop signal output from the signal component analysis unit to the second output control unit via the bonding wire.

In addition, the summary of the other inventions of the application will be briefly described.

The invention has a sensor module having a first detection element that detects acceleration from outside, an acceleration signal processing unit that processes an acceleration signal detected by the first detection element, a first filter that removes a noise from the signal processed by the acceleration signal processing unit, a second detection element that detects another physical quantity than acceleration, a first physical quantity signal processing unit that processes a physical quantity signal detected by the second detection element, and a second filter that removes a noise from the signal processed by the first physical quantity signal processing unit, and a processor that controls an actuator according to the signals output via the first and the second filters, wherein the processor has a second filter that removes a noise from the signal processed by the first physical quantity signal processing unit, a signal component analysis unit that analyzes a frequency component of the signal processed by the acceleration signal processing unit, determines whether or not a physical quantity having a frequency split component representing a difference between a frequency in a drive direction of the second detection element and a frequency in a detection direction of the second detection element is applied, and, if determining that the physical quantity having the frequency split component is applied, outputs an output stop signal, and an internal state determination unit that makes a transition to a state in which the processor does not perform the control of the actuator when the stop signal is output from the signal component analysis unit.

Further, the invention has a sensor module having a first detection element that detects acceleration from outside, an acceleration signal processing unit that processes an acceleration signal detected by the first detection element, a first filter that removes a noise from the signal processed by the acceleration signal processing unit, a second detection element that detects another physical quantity than acceleration, a first physical quantity signal processing unit that processes a physical quantity signal detected by the second detection element, and a second filter that removes a noise from the signal processed by the first physical quantity signal processing unit, and a processor that controls an actuator according to the signals output via the first and the second filters, wherein the processor has a signal component analysis unit that analyzes a frequency component of the signal output from the first filter, determines whether or not a physical quantity having a frequency split component representing a difference between a frequency in a drive direction of the second detection element and a frequency in a detection direction of the second detection element is applied, and, if determining that the physical quantity having the frequency split component is applied, outputs an output stop signal, and an internal state determination unit that makes a transition to a state in which the processor does not perform the control of the actuator when the stop signal is output from the signal component analysis unit.

Advantageous Effects

Among the inventions disclosed in the application, the advantageous effects obtained by the representatives will be briefly explained as below.

(1) The abnormal value output by the sensing of the angular velocity at the frequency split may be prevented, and thereby, the sensor module with higher accuracy may be realized without the need for the adjustment of the frequency split in the sensor module.

(2) Further, according to (1), the sensor module with higher reliability at lower cost may be realized.

(3) Furthermore, the sensor system is formed using the sensor module, and thereby, the reliability in the sensor system may be improved.

DESCRIPTION OF EMBODIMENTS

As below, embodiments of the invention will be explained in detail with reference to the drawings. Note that, in all drawings for explanation of the embodiments, the same members basically have the same signs and their repetitive explanation will be omitted.

Embodiment 1

Figure 1:
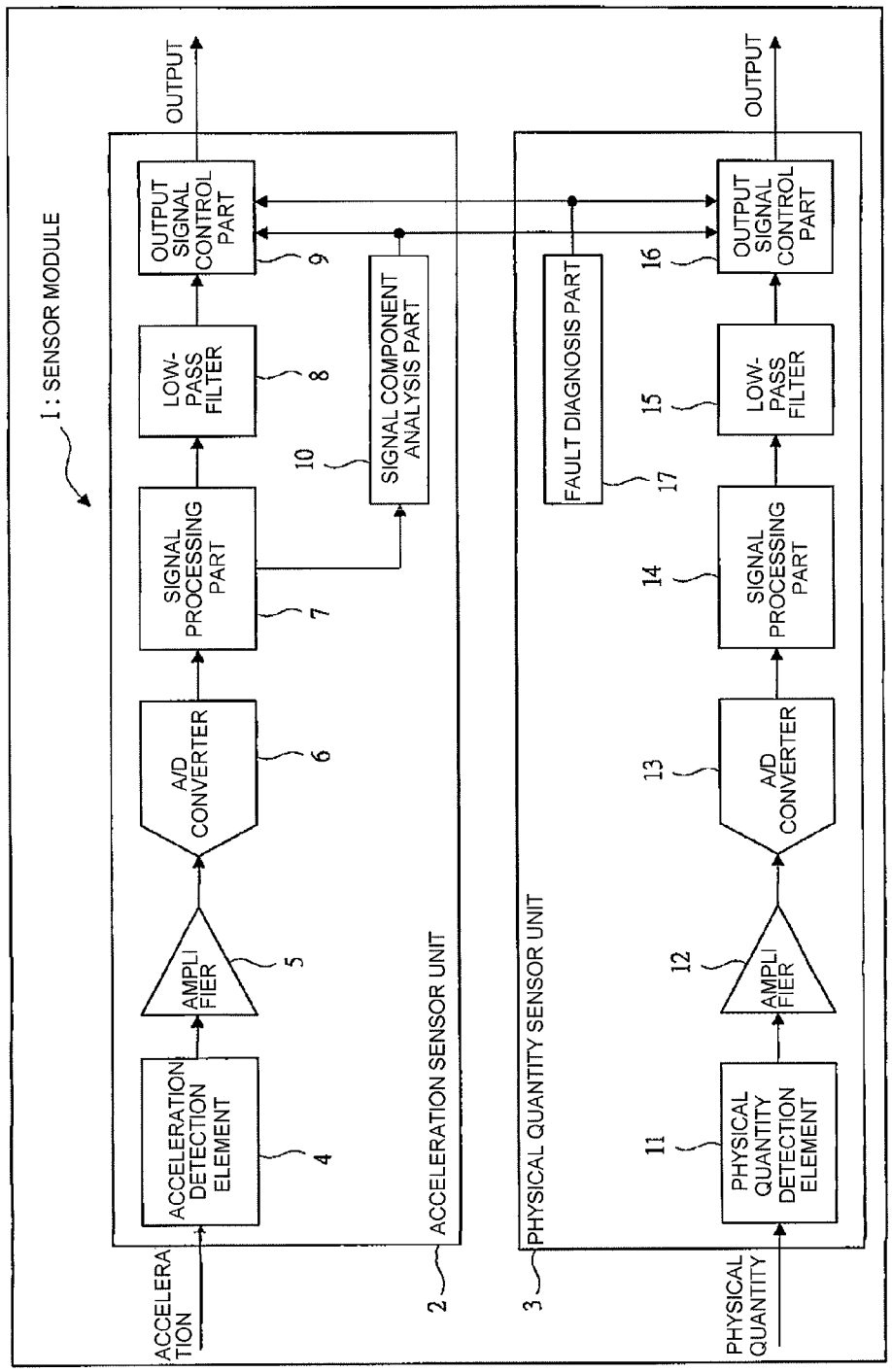
FIG. 1 is a block diagram showing an example of a configuration in a sensor module according to embodiment 1 of the invention.
Figure 2:
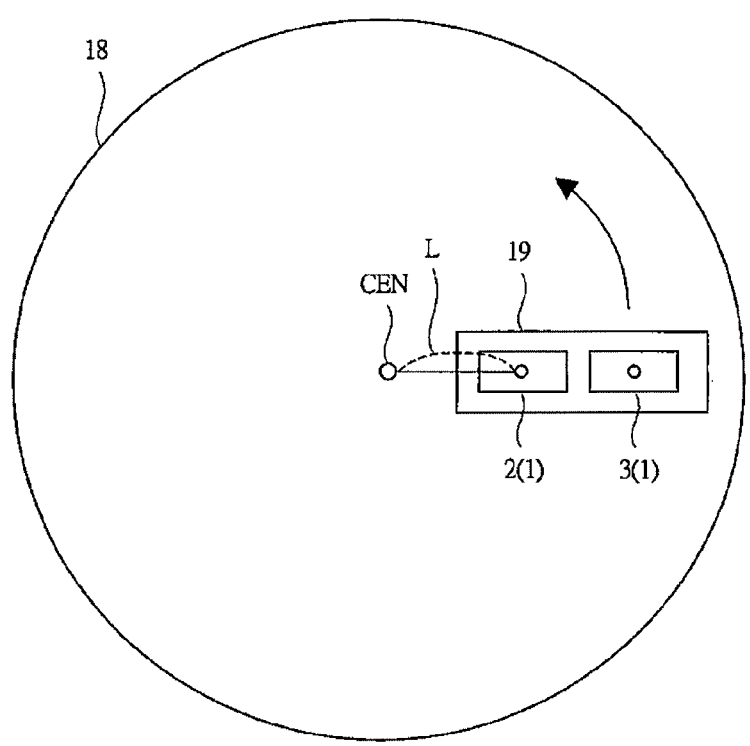
FIG. 2 is an explanatory diagram showing an example of a relevance between acceleration and another physical quantity.
Figure 3:
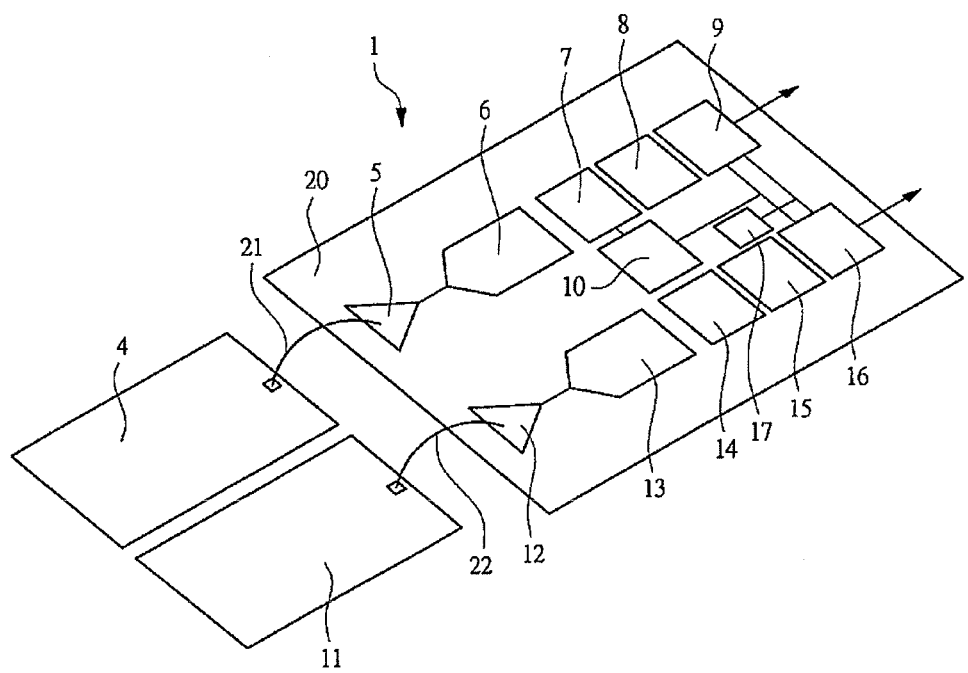
FIG. 3 is an explanatory diagram showing an example of a mounting embodiment in the sensor module in FIG. 1.
Figure 4:
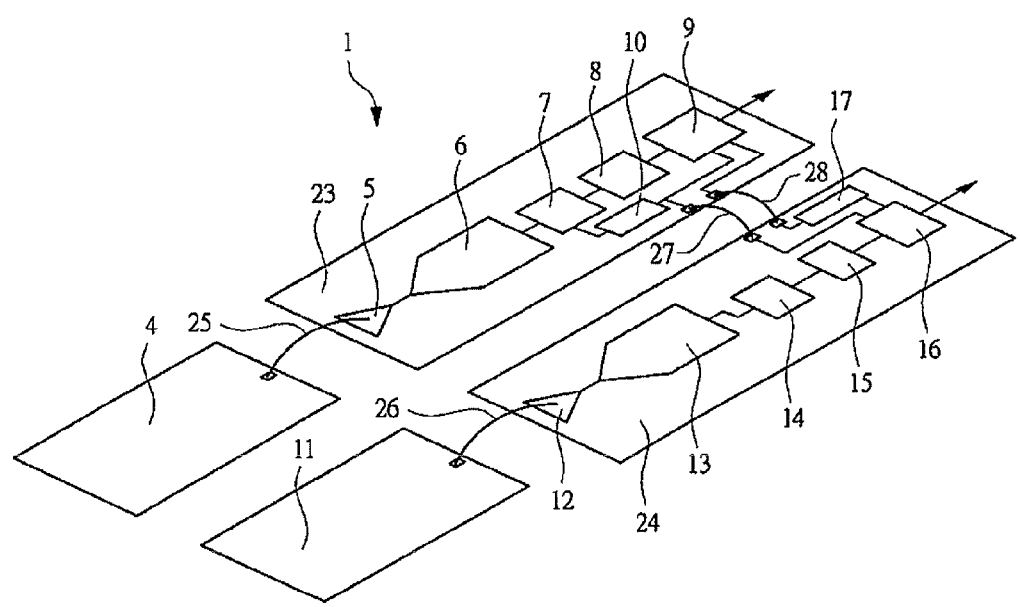
FIG. 4 is an explanatory diagram showing another example of FIG. 3.
Figure 5:
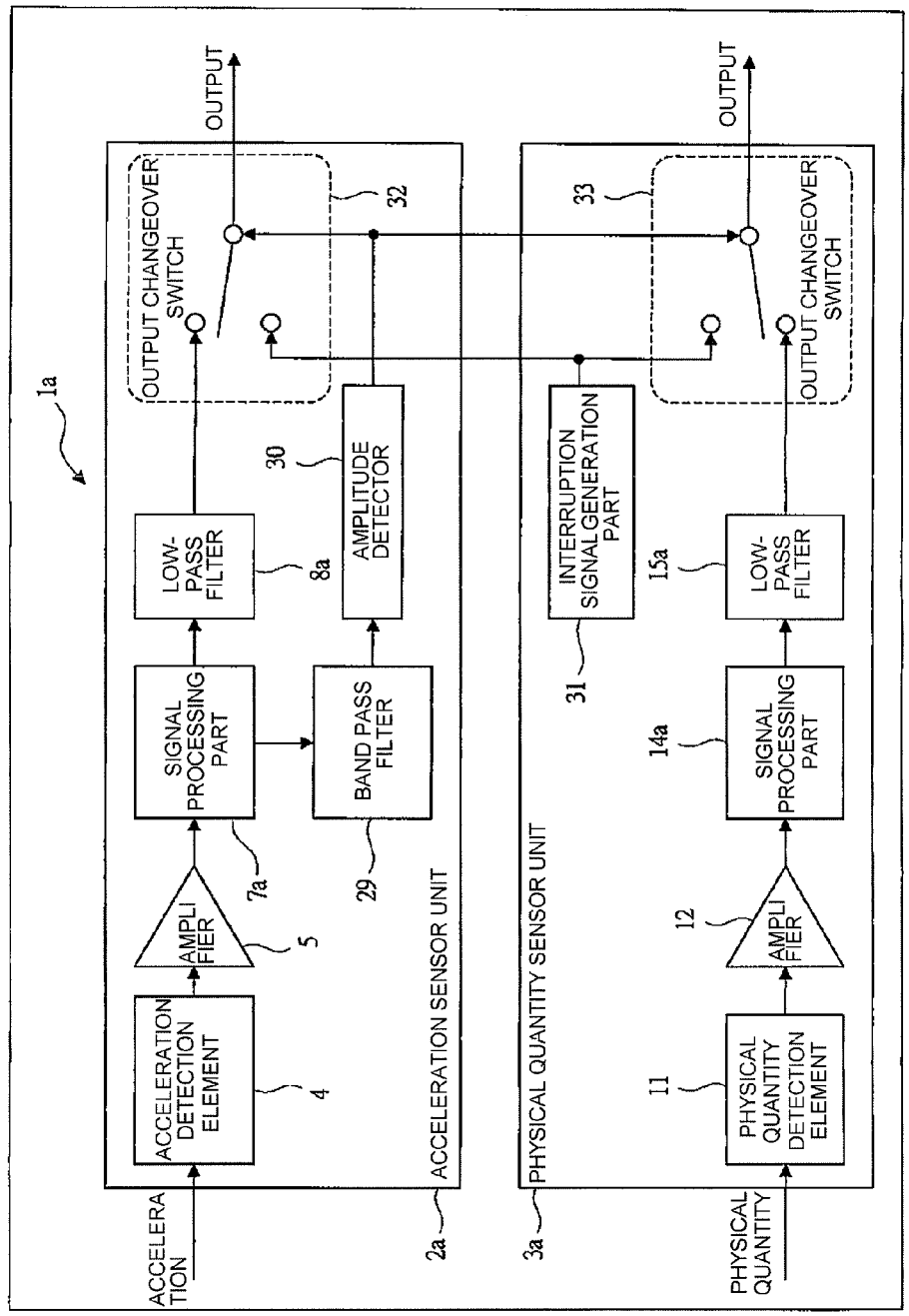
FIG. 5 is a block diagram showing another example in the sensor module in FIG. 1.

FIG. 1 is a block diagram showing an example of a configuration in a sensor module according to embodiment 1 of the invention, FIG. 2 is an explanatory diagram showing an example of a relevance between acceleration and another physical quantity, FIG. 3 is an explanatory diagram showing an example of a mounting embodiment in the sensor module in FIG. 1, FIG. 4 is an explanatory diagram showing another example than FIG. 3, and FIG. 5 is a block diagram showing another example in the sensor module in FIG. 1.

<<Outline of Invention>>

The first outline of the invention is a sensor module having a first detection element (acceleration detection element 4) that detects acceleration from the outside, a second detection element (physical quantity detection element 11) that detects another physical quantity than acceleration, an acceleration signal processing unit (amplifier 5, A/D converter 6, signal processing part 7) that processes an acceleration signal (voltage signal) detected by the first detection element, a first filter (low-pass filter 8) that removes a noise from the signal processed by the acceleration signal processing unit, a signal component analysis unit (a signal component analysis part 10) that analyzes a frequency component of the signal processed by the acceleration signal processing unit, determines whether or not a physical quantity having a frequency split component representing a difference between a frequency in a drive direction of the second detection element and a frequency in a detection direction of the second detection element is applied, and, if determining that the physical quantity having the frequency split component is applied, outputs an output stop signal, and a first output control unit (output signal control part 9) that stops output of the signal output from the first filter when the output stop signal is output from the signal component analysis unit.

Further, the sensor module has a first physical quantity signal processing unit (amplifier 12, A/D converter 13, signal processing part 14) that processes a physical quantity signal (voltage signal) detected by the second detection element, a second filter (low-pass filter 15) that removes a noise from the signal processed by the first physical quantity signal processing unit, and a second output control unit (output signal control part 16) that stops output of the signal output from the second filter when the output stop signal is output from the signal component analysis unit.

As below, the embodiments will be explained in detail according to the above described outline.

In embodiment 1, the sensor module 1 is a module for detecting various physical quantities, and used for an antiskid brake system mounted on an automobile, for example.

As shown in FIG. 1, the sensor module 1 includes an acceleration sensor unit 2, and a physical quantity sensor unit 3. The acceleration sensor unit 2 includes an acceleration detection element 4, an amplifier 5, an A/D (Analog/Digital) converter 6, a signal processing part 7, a low-pass filter 8, an output signal control part 9, and a signal component analysis part 10.

Further, the physical quantity sensor unit 3 includes a physical quantity detection element 11, an amplifier 12, an A/D converter 13, a signal processing part 14, a low-pass filter 15, an output signal control part 16, and a fault diagnosis part 17.

Note that, in FIG. 1, the signal component analysis part 10 is provided in the acceleration sensor unit 2 and the fault diagnosis part 17 is provided in the physical quantity sensor unit 3, however, the signal component analysis part 10 and the fault diagnosis part 17 may be provided either in the acceleration sensor unit 2 or the physical quantity sensor unit 3.

In the acceleration sensor unit 2, the acceleration detection element 4 senses acceleration from outside. The amplifier 5 amplifies the signal sensed by the acceleration detection element 4. The A/D converter 6 converts the analog signal output from the amplifier 5 into a digital signal.

The signal processing part 7 performs signal processing of the digital signal output from the A/D converter 6. The low-pass filter 8 is a filter that respectively passes only the signals at the lower frequencies of the signals output from the signal processing part 7.

The output signal control part 9 performs output control of the signal output from the low-pass filter 8 according to an output stop signal from the signal component analysis part 10. The signal component analysis part 10 outputs the output stop signal to the output signal control parts 9, 16 based on an analysis result on the analysis by the signal processing part 7.

In the physical quantity sensor unit 3, the physical quantity detection element 11 senses another physical quantity than the acceleration from outside. The amplifier 12 amplifies the signal sensed by the physical quantity detection element 11. The A/D converter 13 converts the analog signal output from the amplifier 12 into a digital signal.

The signal processing part 14 performs signal processing of the digital signal output from the A/D converter 13. The low-pass filter 15 is a filter that respectively passes only the signals at the lower frequencies of the signals output from the signal processing part 14.

The output signal control part 16 performs output control of the signal output from the low-pass filter 15 according to the output stop signal from the signal component analysis part 10. The fault diagnosis part 17 notifies the output signal control parts 9, 16 of a fault.

Operations with respect to the sensor module 1 will be explained as below.

The acceleration detection element 4 is a capacitance element that captures displacement of a mass generated by application of acceleration in capacitance change, and converts the capacitance change into a voltage signal by C/V (Capacitance to Voltage) conversion.

Further, the physical quantity detection element 11 senses another physical quantity than the acceleration from outside, for example, an angular velocity. The physical quantity detection element 11 is a capacitance element that captures displacement of the mass generated by application of the physical quantity in capacitance change like the acceleration detection element 4, and converts the capacitance change into a voltage signal by C/V conversion.

Then, in the amplifiers 5, 12, the respective electrical signals of the acceleration detection element 4 and the physical quantity detection element 11 are converted to appropriate levels. Note that, generally, for the amplifiers, there are allowable signal levels of input signals (hereinafter, referred to as "ranges") and, when signals above the ranges are input, a phenomenon called saturation occurs and the outputs of the amplifiers 5, 12 lose linearity.

Accordingly, it is necessary to adjust the signal ranges to ranges that are not saturated by the signals from the acceleration detection element 4 and the physical quantity detection element 11. Further, when the ranges of the amplifiers 5, 12 are variable, the output ranges as the sensors are also variable, and thus, the ranges of the amplifiers 5, 12 may be variable.

The signal levels of the voltage signals respectively output from the amplifiers 5, 12 are respectively converted into digital values by the A/D converters 6, 13. Thereby, the downstream signal processing parts 7, 14 may be digitized, and signal processing at lower cost with higher accuracy may be realized.

In this regard, the A/D converters 6, 13 may have any configuration, and any architecture of the so-called flash type, pipeline type, successive-approximation type, or delta-sigma type.

Then, the digital signals through the A/D converters 6, 13 are respectively sent to the signal processing parts 7, 14, and processed into appropriate signals as sensor output values by the signal processing parts 7, 14. First, if the digital signals through the A/D converters 6, 13 have been modulated in some way, demodulation is performed here. For example, if carrier signals are superimposed thereon, synchronous detection and filtering of the carrier signals are performed in the signal processing parts 7, 14 for demodulation into baseband signals.

Then, output signal shaping, such as compensation for temperature change, correction of bias, and correction of sensitivity, is performed. The above described signal processing may be adapted by a semiconductor integrated circuit device including a dedicated LSI (Large Scale Integration) or a DSP (Digital Signal Processor) and corresponding rewritable software.

The signal component analysis part 10 receives the signal output from the signal processing part 7, and analyzes application of a physical quantity having a frequency split with respect to the physical quantity. The frequency split is a frequency component representing a difference between a frequency in a drive direction of the physical quantity detection element 11 and a frequency in a detection direction of the physical quantity detection element 11.

When the physical quantity detection element 11 has the frequency split, a sum of the frequency of the applied angular velocity and the frequency in the drive direction comes closer to a resonance frequency in the detection direction, and frequency characteristics having a peak of sensor output in the frequency split band is obtained. Thereby, it may be possible that an abnormal value is output from the sensor module 1.

Here, when the physical quantity detection element 11 does not detect the angular velocity, but detects pressure, the signal component analysis part 10 analyzes application of the resonance frequency, not the frequency split.

For application determination of the frequency split, generally, the signal component analysis part 10 preferably analyzes the baseband signal after signal demodulation by the signal processing part 7, however, may make an analysis from a signal on which any processing has not been performed by the signal processing part 7, or may directly analyze the output from the A/D converter 6, not through the signal processing part 7.

Further, an independent A/D converter (not shown) may be provided for the signal component analysis part 10 or an independent amplifier (not shown) may be provided, and signals may be provided to the signal component analysis part 10 directly from them.

Furthermore, it is not necessary that the signal processing part 7 and the signal component analysis part 10 are physically different circuits, but they exist in a single semiconductor integrated circuit device including an LSI. Alternatively, the signal processing part 7 and the signal component analysis part 10 may be realized as software of a DSP.

The signal component analysis part 10 determines whether or not a frequency split component is contained in a certain value or more in the other physical quantity than acceleration using the digital signal of the acceleration detection element 4.

Here, the principle will be explained using FIG. 2. FIG. 2 is the explanatory diagram showing the example of the relevance between acceleration and the other physical quantity.

A sensor module package 19 is mounted on a common substrate 18. The sensor module package 19 is a package on which the sensor module 1 is mounted. In the case of an automobile, for example, the common substrate 18 corresponds to a chassis. Further, as shown in the drawing, the acceleration sensor unit 2 is provided on the left side of the sensor module package 19, and the physical quantity sensor unit 3 is provided on the right side.

Now, in the case where the physical quantity is considered as an angular velocity, when the angular velocity is applied to the common substrate 18 in a direction of an arrow shown in FIG. 2, an angular velocity ω (rad/s) is observed in the physical quantity sensor unit 3. Further, concurrently, a centrifugal force $F=mr\omega^2$ is applied to the acceleration sensor unit 2.

Here, m is a mass of an acceleration sensing mass of the acceleration sensor unit 2, r is a distance L between a rotation center CEN of the substrate and the center of gravity of the acceleration sensor unit 2 (=radius of rotation). That is, when the acceleration sensor unit 2 has sensitivity in the axial direction of the centrifugal force generated by the applied angular velocity, if the distance L between the rotation center CEN of the common substrate 18 and the center of gravity of the acceleration sensor unit 2 is unknown, whether or not the angular velocity is applied may be sensed in the acceleration sensor unit 2, and further, its frequency component is also made clear from an analysis by the acceleration sensor unit 2.

Note that, in FIG. 2, the acceleration sensor unit 2 and the physical quantity sensor unit 3 for the other than acceleration are housed within one sensor module package 19, however, the acceleration sensor unit 2 and the physical quantity sensor unit 3 for the other than acceleration are not necessarily housed within the same package, as long as they may be provided on the common substrate 18.

Furthermore, the common substrate 18 is not particularly limited as long as the physical quantity (here, the inertia quantity) is applied in the same way, such as a printed board or a casing.

Note that, here, in the analysis by the acceleration sensor unit 2, it is conceivable that, for example, a Fourier analysis (FFT: Fast Fourier Transform) for computation of the frequency component is performed and how much the component in the frequency split band is contained is determined with respect to discrete time T, and whether or not the component exceeds a fixed threshold value is determined.

Further, as another analysis method, there are a wavelet analysis that may analyze the lower frequency band with higher accuracy even in a shorter time, a simple analysis method of combining BPF (Band Pass Filter) and signal level determination, and any analysis method may be employed as long as the application of the physical quantity at the frequency split may be determined.

The explanation is returned to FIG. 1. If the signal component analysis part 10 has determined that the application of the frequency split component of the physical quantity exceeds a threshold value, the part respectively outputs output stop signals to the output signal control parts 9, 16. The output signal control parts 9, 16 receive the output stop signals output from the signal component analysis part 10, and stop output of the acceleration signal and the physical quantity signal from which noise has been removed through the signal processing parts 7, 14 by the low-pass filters 8, 15.

This is because, when the physical quantity in the frequency split component is applied, it is highly possible that saturation has occurred within the circuit, and reliability as the sensor signal may not be secured. Therefore, an approach not to dare to output unstable signals improves safety as the entire system.

Further, the output signal control parts 9, 16 may not stop the signal outputs from the low-pass filters 8, 15, but may output flags (e.g., continuous "1" signals) that notifies temporary stops of the signals (hereinafter, referred to "suspend").

This contributes to improvement in reliability of the entire system because the temporal suspend of the signal output in an extremely short time due to application of the physical quantity at the frequency split is notified to the system at the side using the sensor module 1, and thereby, the system may perform processing in response to the suspend of the sensor output.

In addition, if the determination that the application of the frequency split component of the physical quantity has exceeded the threshold value is made by the signal component analysis part 10, the above described function maintenance may be realized by an approach to maintain the function as the sensor even with permission of the deterioration of the accuracy such that the gain of the physical quantity detection element 11 and the amplifier 12 is reduced and the range of the A/D converter 6 is made wider or, in the case of the angular velocity sensor using the Coriolis effect as the principle as shown in "Background Art", by reducing the amplitude in the drive direction (reducing the drive voltage) to suppress the generation of saturation. In this regard, non-steady state may be notified to the outside.

The fault diagnosis part 17 is a circuit that monitors the signals of the analog signals and the digital signals within the sensor module 1 and, if detecting an abnormality, notifies the output signal control parts 9, 16 of a fault. The fault diagnosis part 17 may be formed using a program, for example, not hardware.

If the determination that the application of the frequency split component of the physical quantity has exceeded the threshold value is made by the signal component analysis part 10, the determination result may be notified to the fault diagnosis part 17 and, even when the inner signal value is an abnormal value, the fault diagnosis part 17 may command not to make a diagnosis of a fault.

This prevents the diagnosis of a fault of the sensor due to the temporal signal abnormality by a known cause such as the application of the frequency split component of the physical quantity, and contributes to extension of replacement cycle of the sensor.

Note that, here, the configuration in which the output signal control parts 9, 16 are connected at the downstream of the low-pass filters 8, 15 is an example, and the part for stopping the signals and providing the flags may be provided in any location within the circuit, and a mechanism for performing indirect signal stop such that the carrier signal applied to the physical quantity detection element 11 may be stopped in a fixed time may be employed.

Also note that the relevance between the acceleration sensor and the angular velocity sensor is used for the sensing principle of application of the frequency split, and thus, even when only acceleration is applied in the frequency split band, i.e., even when disturbance occurs, suspend of the sensor may occur.

Therefore, it is preferable to design the physical quantity detection element 11 so that the frequency split may fall in the frequency band wider than the necessary frequency band in which disturbance is hard to occur among the frequency components of acceleration.

Further, it has been generally known that the linearity of the output signal with respect to the amount of displacement of the physical quantity detection element 11 is improved by a configuration of a servo circuit for suppressing the displacement of the physical quantity detection element 11, and a servo circuit (not shown) may be formed by addition of a feedback path to the circuit configuration of the sensor module 1 shown in FIG. 1. Note that, in the servo system, it is necessary to form the circuit so that its response frequency may be higher than the frequency split band.

FIG. 3 is the explanatory diagram showing the example of the mounting embodiment in the sensor module 1.

As shown in FIG. 1, the sensor module 1 has a configuration in which the acceleration detection element 4 and the physical quantity detection element 11 are connected to a semiconductor chip 20 on which the amplifier 5, the A/D converter 6, the signal processing part 7, the low-pass filter 8, the output signal control part 9, the signal component analysis part 10, the amplifier 12, the A/D converter 13, the signal processing part 14, the low-pass filter 15, the output signal control part 16, and the fault diagnosis part 17 are formed.

The acceleration detection element 4 is connected to the semiconductor chip 20 via a bonding wire 21 and the physical quantity detection element 11 is connected to the semiconductor chip 20 via a bonding wire 22.

FIG. 4 is the explanatory diagram showing another example than FIG. 3.

In this case, the difference from FIG. 3 is in a two-chip configuration having a semiconductor chip 23 on which the amplifier 5, the A/D converter 6, the signal processing part 7, the low-pass filter 8, the output signal control part 9, and the signal component analysis part 10 are formed and a semiconductor chip 24 on which the amplifier 12, the A/D converter 13, the signal processing part 14, the low-pass filter 15, the output signal control part 16, and the fault diagnosis part 17 are formed.

Further, the acceleration detection element 4 is connected to the semiconductor chip 23 via a bonding wire 25 and the physical quantity detection element 11 is connected to the semiconductor chip 24 via a bonding wire 26.

Furthermore, the semiconductor chip 23 and the semiconductor chip 24 are respectively connected via bonding wires 27, 28. The bonding wire 27 is a signal line that transmits the output stop signal output from the signal component analysis part 10 formed on the semiconductor chip 23 to the output signal control part 16, and the bonding wire 28 is a signal line that transmits the signal for notifying the fault output from the fault diagnosis part 17 formed on the semiconductor chip 24.

The output stop signal output from the signal component analysis part 10 is input to the output signal control part 9 formed on the semiconductor chip 23 and input to the output signal control part 16 formed on the semiconductor chip 24 via the bonding wire 27.

Further, the signal for notifying the fault output from the fault diagnosis part 17 is input to the output signal control part 16 formed on the semiconductor chip 24 and input to the output signal control part 9 formed on the semiconductor chip 23 via the bonding wire 28.

In the case of the configuration shown in FIG. 3, the amplifier 5, the A/D converter 6, the signal processing part 7, the low-pass filter 8, the output signal control part 9, the signal component analysis part 10, the amplifier 12, the A/D converter 13, the signal processing part 14, the low-pass filter 15, the output signal control part 16, and the fault diagnosis part 17 are formed on one semiconductor chip 20, and thereby, the bonding wires 27, 28 and bonding electrodes necessary for bonding of the bonding wires formed on the semiconductor chips 23, 24 may be made unnecessary.

In addition, the bonding work for bonding wires is also unnecessary, and thereby, the cost may be reduced.

Further, in the configuration of FIG. 3, it is possible to make the signal processing part 14 unnecessary by sharing the signal processing part 7 and, in this case, the chip area may be reduced and downsizing and further cost reduction of the sensor module 1 may be realized.

Furthermore, in FIG. 3, the acceleration detection element 4 and the physical quantity detection element 11 are connected to the semiconductor chip 23 via the bonding wires 21, 22, however, for example, the acceleration detection element 4 and the physical quantity detection element 11 may be formed on the semiconductor chip 23. According to the configuration, noise derived from the parasitic component may be reduced.

In addition, the configuration shown in FIG. 4 is not preferable in view of cost, however, it may be sufficient for implementation of the example and exertion of the example by the mounting method is considered as an option.

So far, the case where the internal signals are digitally processed has been shown, however, for example, as shown in FIG. 5, all of the analog internal signals may be processed as they are.

In this case, as shown in FIG. 5, a sensor module 1a includes an acceleration sensor unit 2a, and a physical quantity sensor unit 3a. The acceleration sensor unit 2a includes the acceleration detection element 4, the amplifier 5, a signal processing part 7a, a low-pass filter 8a, a band pass filter 29, an amplitude detector 30, and an output changeover switch 32.

Further, the physical quantity sensor unit 3a includes the physical quantity detection element 11, the amplifier 12, a signal processing part 14a, a low-pass filter 15a, an interruption signal generation part 31, and an output changeover switch 33.

Note that, in FIG. 5, the amplitude detector 30 is provided in the acceleration sensor unit 2a and the interruption signal generation part 31 is provided in the physical quantity sensor unit 3a, however, the amplitude detector 30 or the interruption signal generation part 31a may be provided either in the acceleration sensor unit 2a or the physical quantity sensor unit 3a.

An output part of the low-pass filter 8a is connected to one input part of the output changeover switch 32, and an output part of the interruption signal generation part 31 is connected to the other input part of the output changeover switch 32.

Further, an output part of the low-pass filter 15a is connected to one input part of the output changeover switch 33, and an output part of the interruption signal generation part 31 is connected to the other input part of the output changeover switch 33.

The output changeover switch 32 switches and outputs either of the signal output from the low-pass filter 8a or the signal output from the interruption signal generation part 31 according to the determination result output from the amplitude detector 30.

The output changeover switch 33 switches and outputs either of the signal output from the low-pass filter 15a or the signal output from the interruption signal generation part 31 according to the determination result output from the amplitude detector 30.

In the sensor module 1a, when the signal is analog-processed, to determine whether or not the signal in the frequency split band is applied, for example, a configuration including the band pass filter (BFP) 29 and the amplitude detector 30 is considered.

That is, only the signal in the frequency split band is passed in the band pass filter 29 and squaring of the signal and threshold determination of the signal value are performed in the amplitude detector 30, and thereby, whether or not the frequency split with respect to the other physical quantity than acceleration is applied may be determined.

Then, the output changeover switches 32, 33 that select the signals from the interruption signal generation part 31 representing the interrupted state and the signals from the low-pass filters 8a, 15a are switched in response to the signal output from the amplitude detector 30, and thereby, suspend at the application of the frequency split is realized.

In this regard, the signal from the interruption signal generation part 31 may not be particularly limited, but may be the signal at the ground (reference potential) level, the signal having a particular period, or the like as long as it may be distinct from the output at the normal time.

Further, the output changeover switches 32, 33 are not essential, but a configuration in which the output of the amplitude detector 30 is output as it is and suspend is notified to the system side using the sensor through it may be employed.

Thereby, according to the embodiment 1, the application of the physical quantity having the frequency split component specific to the physical quantity detection element 11 may be detected from the signal frequency component of the acceleration signal in the wider band before passing through the low-pass filter 8, and thereby, the sensor output may be temporarily stopped only when the application of the frequency split exceeds a certain level and this may be notified.

Accordingly, while the costly adjustment of the frequency split is unnecessary, the sensor module 1 with high reliability that does not output any abnormal value or cause fault misdiagnosis may be realized.

Note that, in the embodiment 1, the case where the sensor module 1 includes the acceleration sensor unit 2 and the physical quantity sensor unit 3 has been described, however, a configuration having a plurality of the physical quantity sensor units 3 except the fault diagnosis part 17 may be employed. Also, in this case, the plurality of physical quantity sensor units 3 stop output of the physical quantity signal according to the output stop signal output from the signal component analysis part 10.

Embodiment 2

Figure 6:
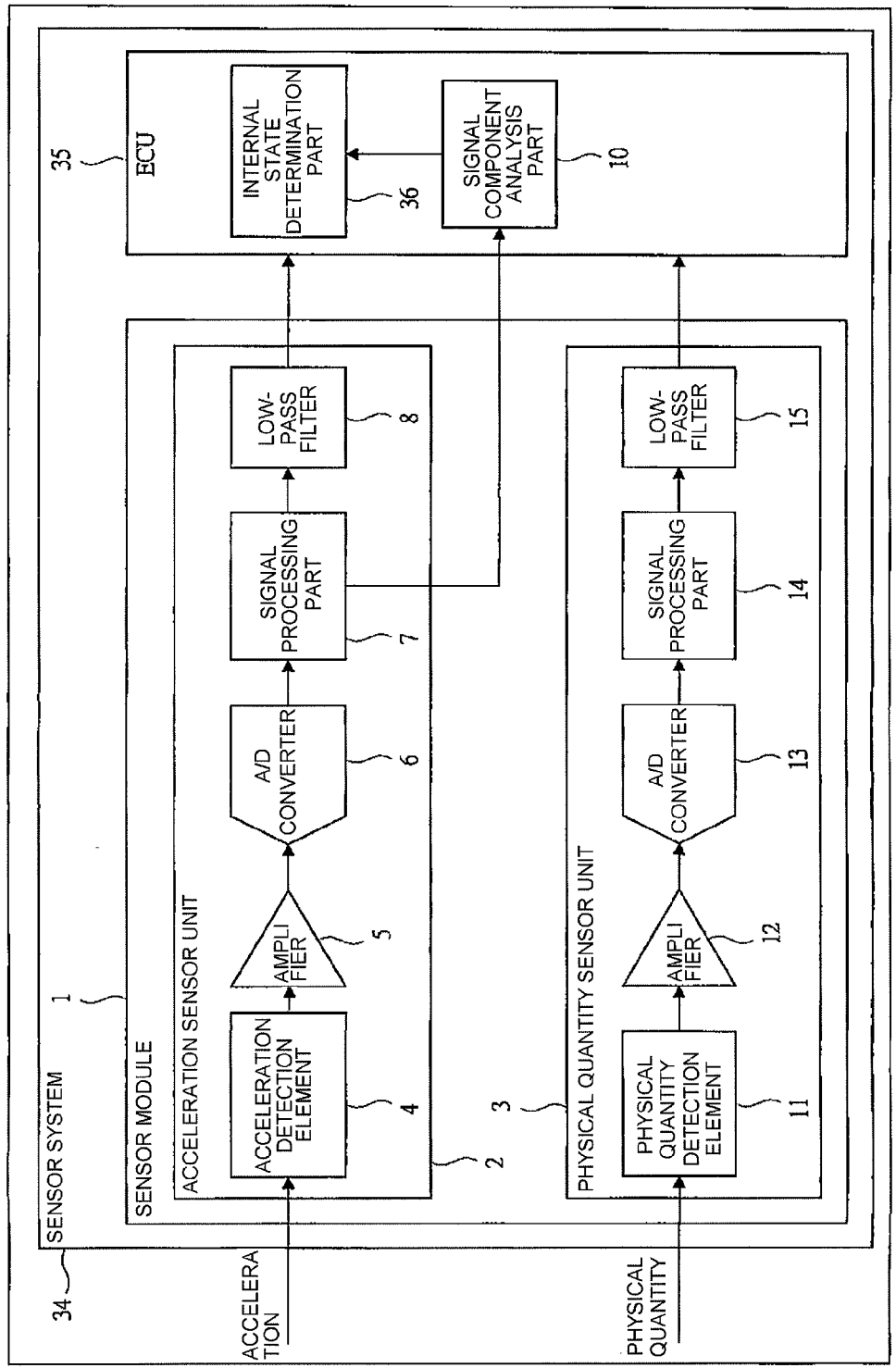
FIG. 6 is an explanatory diagram showing an example in a sensor system formed using a sensor module according to embodiment 2 of the invention.

FIG. 6 is an explanatory diagram showing an example in a sensor system formed using a sensor module according to embodiment 2 of the invention.

<<Outline of Invention>>

The second outline of the invention is a sensor system (sensor system 34) including a processor (ECU 35) and a sensor module (sensor module 1).

The sensor module has a first detection element (acceleration detection element 4) that detects acceleration from the outside, an acceleration signal processing unit (amplifier 5, A/D converter 6, signal processing part 7) that processes an acceleration signal (voltage signal) detected by the first detection element, a first filter (low-pass filter 8) that removes a noise from the signal processed by the acceleration signal processing unit, a second detection element (acceleration detection element 11) that detects another physical quantity than acceleration, a first physical quantity signal processing unit (amplifier 12, A/D converter 13, signal processing part 14) that processes the physical quantity signal (voltage signal) detected by the second detection element, and a second filter (low-pass filter 15) that removes a noise from the signal processed by the first physical quantity signal processing unit.

Further, the processor has a signal component analysis part (the signal component analysis part 10) that performs control operation of an actuator according to the signal output via the first and the second filters, analyzes the frequency component of the signal processed by the acceleration signal processing unit, determines whether or not the physical quantity having a frequency split component representing a difference between a frequency in a drive direction of the second detection element and a frequency in a detection direction of the second detection element, and, if determining that the physical quantity having the frequency split component is applied, outputs an output stop signal, and an internal state determination part (internal state determination part 36) that makes a transition to a state in which the processor does not perform the control operation of the actuator when the stop signal is output from the signal component analysis part.

As below, the embodiment will be explained in detail according to the above described outline.

In the embodiment 2, an example of the sensor system 34 using the sensor module 1 will be explained. In this case, the sensor system 34 is a system used for an antiskid brake system of an automobile, for example.

As shown in FIG. 6, the sensor system 34 includes the sensor module 1 and the ECU (Electronic Control Unit) 35. In the automobile, many ECUs that manage various controls for an information system including a navigation system and audio, a power train system including an engine and chassis, or a body system including an air-conditioner, head lights, and door locks are mounted, and the ECU 35 is one of the many semiconductor integrated circuit devices mounted thereon.

In this case, the ECU 35 is connected to an actuator such as a hydraulic pump unit that activates the brake of the automobile, for example, and controls the operation of the brake by controlling the actuator of the hydraulic pump unit or the like in the case where the automobile skids or the like.

The sensor module 1 shown in FIG. 6 includes the acceleration sensor unit 2 and the physical quantity sensor unit 3 like that in FIG. 1. The acceleration sensor unit 2 includes the acceleration detection element 4, the amplifier 5, the A/D converter 6, the signal processing part 7, and the low-pass filter 8, and is different from the sensor module 1 in FIG. 1 in that the signal component analysis part 10 is provided in the ECU 35 and the control unit 9 is omitted.

Further, the physical quantity sensor unit 3 includes the physical quantity detection element 11, the amplifier 12, the A/D converter 13, the signal processing part 14, and the low-pass filter 15, and is different from the sensor module 1 in FIG. 1 in that the output signal control part 16 and the fault diagnosis part 17 are respectively omitted. The other configuration in the sensor module 1 in FIG. 6 is the same as that of FIG. 1, and the explanation will be omitted.

The ECU 35 is connected so that the signal output from the acceleration sensor unit 2 (the acceleration signal output via the low-pass filter 8) and the signal output from the physical quantity sensor unit 3 (the other physical quantity signal than acceleration output via the low-pass filter 15) may be respectively input thereto, and the ECU 35 performs antiskid brake control according to these signals.

Further, in the ECU 35, the signal component analysis part 10 is provided as described above and the internal state determination part 36 is further provided. The signal component analysis part 10 is connected so that the signal output from the signal processing part 7 (the signal before being input to the low-pass filter 8) may be input thereto.

The internal state determination part 36 changes switching of the internal state in response to the analysis result of the signal component analysis part 10, and corresponds to the output signal control parts 9, 16 in FIG. 1.

Here, the signal component analysis part 10 and the internal state determination part 36 are formed by the DSP provided in the ECU 35 and corresponding software. Further, switching of the internal state refers to transitions between a first state in which the signal output by the sensor module 1 is available (i.e., a state in which the output value has reliability) and a second state in which the signal output by the sensor module 1 is unavailable to each other.

The reliability and safety of the sensor system 34 may be secured by the setting such that, in the case of the first state, for example, the internal state determination part 36 performs brake control or the like using the sensor output value, and, in the second state, the internal state determination part 36 does not any brake control.

Note that the condition for determination of the state transition by the internal state determination part 36 may be dynamically changed or recorded in an unalterable memory in advance. Further, a display part that displays the internal state may be provided.

Thereby, also, in the embodiment 2, the sensor module 1 with high reliability may be realized.

In addition, the configuration of the sensor system 34 is not made complex, but may be adapted only by the change of the software of the ECU 35, and thus, the cost rise of the entire sensor system 34 may be suppressed.

Note that, in the sensor system 34, particularly, it is preferable that the physical quantity detected by the physical quantity detection element 11 is the angular velocity and highly relevant to the signal as shown in embodiment 1. However, a different physical quantity such as pressure may be employed.

Embodiment 3

Figure 7:
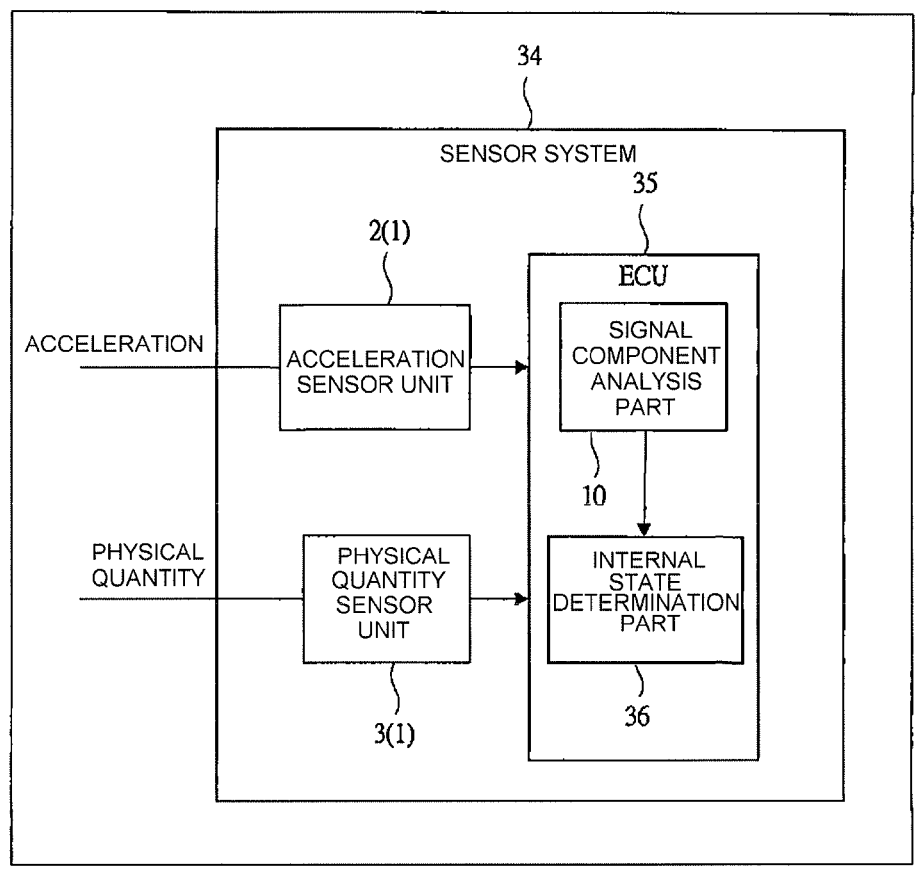
FIG. 7 is an explanatory diagram showing an example in a sensor system formed using a sensor module according to embodiment 3 of the invention.
Figure 8:
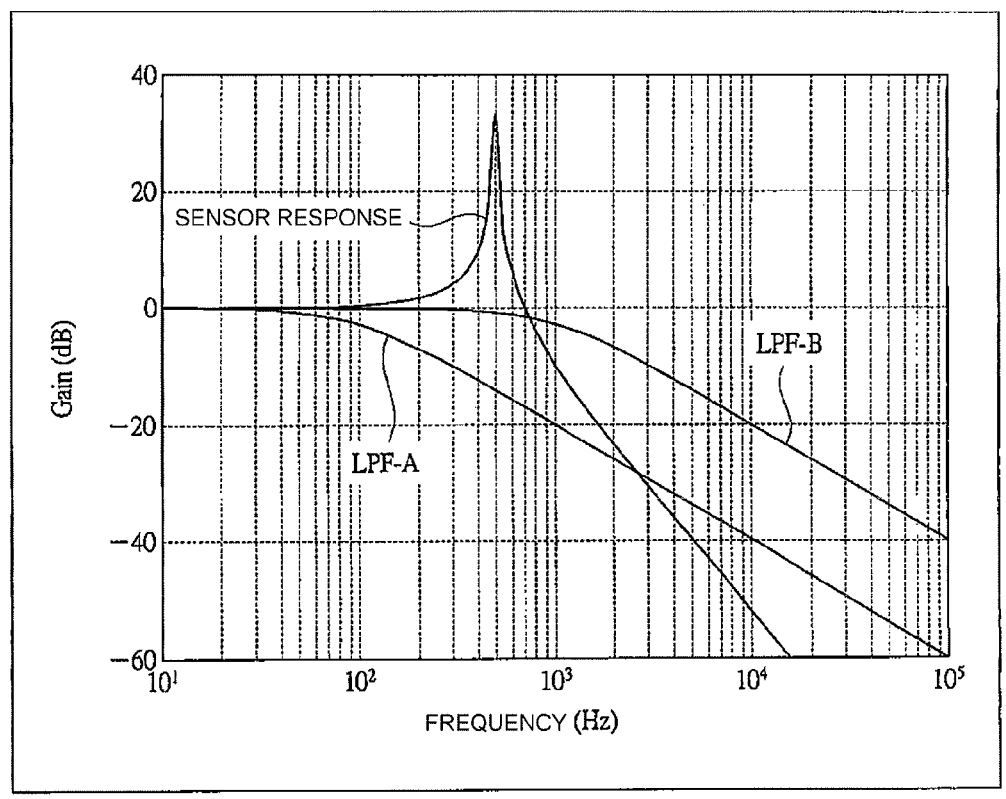
FIG. 8 is an explanatory diagram showing a relationship between sensor response and characteristics of a low-pass filter in an acceleration sensor unit shown in FIG. 7.
Figure 9:
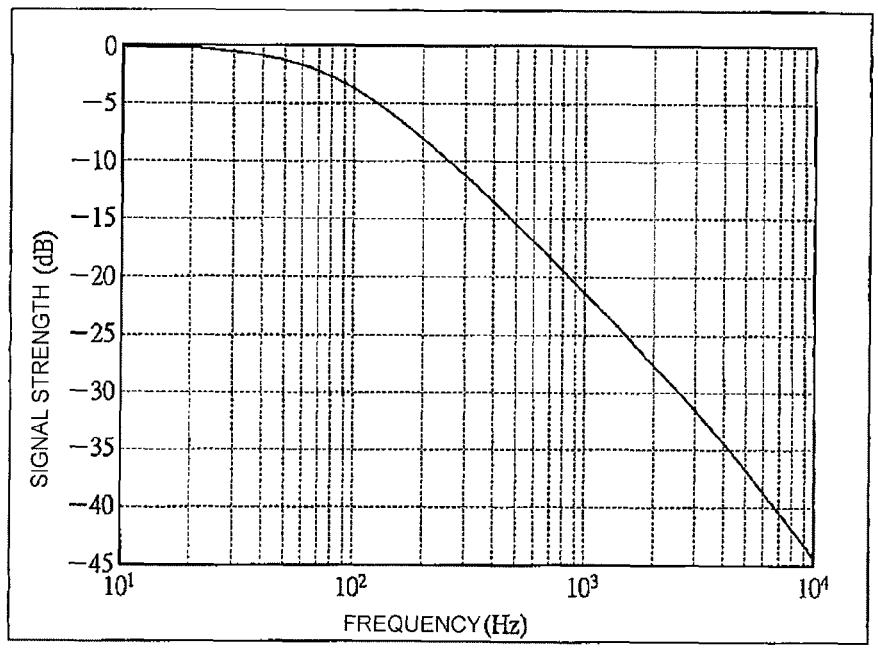
FIG. 9 is an explanatory diagram showing an example of open circuit output characteristics with respect to an input angular velocity frequency of an angular velocity sensor without a frequency split, which has been studied by the inventors.
Figure 10:
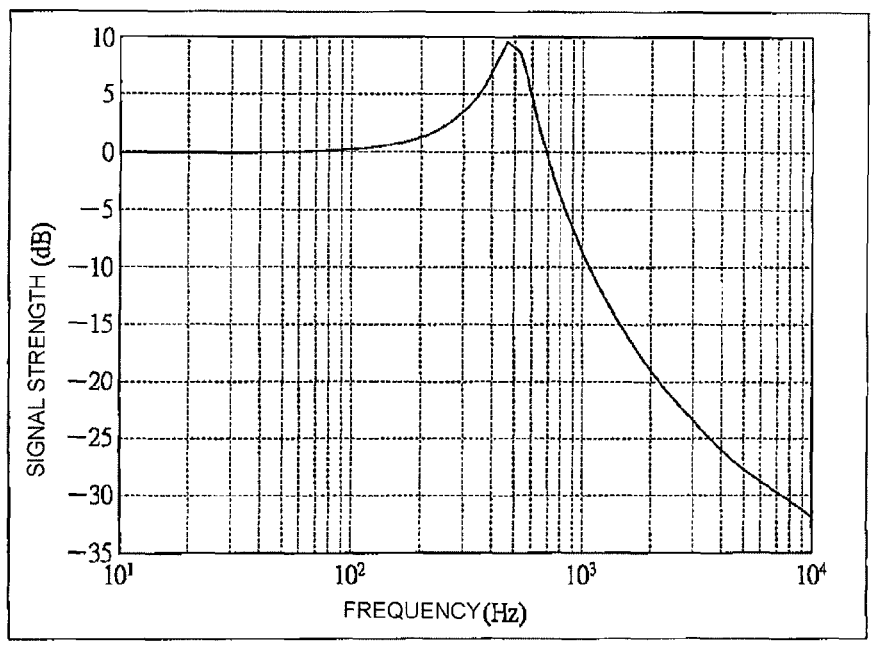
FIG. 10 is an explanatory diagram showing an example of the open circuit output characteristics with respect to the input angular velocity frequency of the angular velocity sensor with the frequency split at 500 Hz, which has been studied by the inventors.

FIG. 7 is an explanatory diagram showing an example in a sensor system formed using a sensor module according to embodiment 3 of the invention, and FIG. 8 is an explanatory diagram showing a relationship between sensor response in an acceleration sensor part shown in FIG. 7 and low-pass filter characteristics.

<<Outline of Invention>>

The third outline of the invention is a sensor system including a processor and a sensor module.

The sensor module has the first detection element (acceleration detection element 4) that detects acceleration from, the outside, the acceleration signal processing unit (amplifier 5, A/D converter 6, signal processing part 7) that processes the acceleration signal (voltage signal) detected by the first detection element, the first filter (low-pass filter 8) that removes the noise from the signal processed by the acceleration signal processing unit, the second detection element (physical quantity detection element 11) that detects another physical quantity than acceleration, the first physical quantity signal processing unit (amplifier 12, A/D converter 13, signal processing part 14) that processes the physical quantity signal (voltage signal) detected by the second detection element, and the second filter (low-pass filter 15) that removes the noise from the signal processed by the first physical quantity signal processing unit.

Further, the processor has the signal component analysis part (the signal component analysis part 10) that controls an actuator according to the signal output via the first and the second filters, analyzes the frequency component of the signal output from the first filter, determines whether or not the physical quantity having the frequency split component representing the difference between the frequency in the drive direction of the second detection element and the frequency in the detection direction of the second detection element, and, if determining that the physical quantity having the frequency split component is applied, outputs the output stop signal, and the internal state determination part (internal state determination part 36) that makes a transition to the state in which the processor does not perform the control of the actuator when the stop signal is output from the signal component analysis part.

As below, the embodiment will be explained in detail according to the above described outline.

In the embodiment 3, an example of the configuration of the sensor system 34 when cutoff of the filter characteristics in the low-pass filters 8, 15 (FIG. 6) is higher than the frequency split will be explained.

As shown in FIG. 7, the sensor system 34 has the same configuration as that of the sensor system 34 in FIG. 6 including the sensor module 1 having the acceleration sensor unit 2 and the physical quantity sensor unit 3 and the ECU 35.

Further, in the ECU 35, the signal component analysis part 10 and the internal state determination part 36 are provided like that in FIG. 6 of the embodiment 2. The sensor module 1 includes the acceleration sensor unit 2 and the physical quantity sensor unit 3, and the sensor system 34 shown in FIG. 7 is different from the sensor system 34 shown in FIG. 6 in that the connecting line connecting the signal processing part 7 and the signal component analysis part 10 of the ECU 35 is omitted.

The other configuration in the sensor system 34 shown in FIG. 7 is the same as that of the sensor system 34 in FIG. 6, and the explanation will be omitted.

FIG. 8 is an explanatory diagram showing a relationship between sensor response and characteristics of the low-pass filter 8 in the acceleration sensor unit 2 shown in FIG. 7.

For example, when the frequency split of the physical quantity sensor unit 3 is about 500 Hz, as shown in FIG. 8, the sensor response (frequency characteristics) having a peak at 500 Hz is obtained. In this regard, when the cutoff of the low-pass filter 8 in the acceleration sensor unit 2 is lower than the frequency split, i.e., when the filter has the characteristics shown by LPF-A in the drawing, as shown in the embodiments 1, 2, it is necessary to determine application of the frequency split using the signal at the upstream of the low-pass filter 8, i.e., the signal output from the signal processing part 7.

However, when the cutoff of the output characteristics of the low-pass filter 8 in the acceleration sensor unit 2 is higher than the frequency split, i.e., when the filter has the characteristics shown by LPF-B in the drawing, it is not necessary to employ the configuration in which the signal before being input to the low-pass filter 8 is input to the signal component analysis part 10.

In this case, as shown in FIG. 7, the sensor system 34 has a configuration in which the output of the acceleration sensor unit 2 is input to the signal component analysis part 10 and performs the same analysis processing as that of the signal component analysis part 10 shown in FIG. 1 of the embodiment 1, and thereby, the internal state determination part 36 may determine whether or not the frequency split is applied.

In other words, the sensor system 34 is adapted so that the cutoff of the output characteristics of the low-pass filter 8 may be higher than the frequency split in the relationship between the output characteristics in the low-pass filter 8 and the sensor response of the physical quantity sensor unit 3, and thereby, only the change of the software within the ECU 35 in the sensor system 34 may be adapted.

In this regard, particularly, it is preferable that the physical quantity detected by the physical quantity sensor unit 3 is the angular velocity and highly relevant to the signal as shown in embodiment 1. However, a different physical quantity such as pressure may be employed.

Thereby, also, in the embodiment 3, the sensor system 34 with higher reliability at lower cost may be realized.

As described above, the invention by the inventors has been specifically explained according to the embodiments, however, it is obvious that the invention is not limited to the embodiments and various changes may be made without departing from the scope of the invention.

INDUSTRIAL APPLICABILITY

The invention is suitable for a technology of preventing an abnormal output value by sensing of an angular velocity near a frequency split in a sensor for sensing acceleration and another physical quantity than acceleration from the outside.

REFERENCE SIGNS LIST 1 sensor module
1a sensor module
2 acceleration sensor unit
2a acceleration sensor unit
3 physical quantity sensor unit
3a physical quantity sensor unit
4 acceleration detection element
5 amplifier
6 A/D converter
7 signal processing part
7a signal processing part
8 low-pass filter
8a low-pass filter
9 output signal control part
10 signal component analysis part
11 physical quantity detection element 12 amplifier
13 A/D converter
14 signal processing part
14a signal processing part
15 low-pass filter
15a low-pass filter
16 output signal control part
17 fault diagnosis part
18 common substrate
19 sensor module package
20 semiconductor chip
21 bonding wire
22 bonding wire
23 semiconductor chip
24 semiconductor chip
25 bonding wire
26 bonding wire
27 bonding wire
28 bonding wire
29 band pass filter
30 amplitude detector
31 interruption signal generation part
32 output changeover switch
33 output changeover switch
34 sensor system
35 ECU
36 internal state determination part

The invention claimed is:

1. A sensor module characterized by comprising:
   a first detection element that detects acceleration from outside;
   an acceleration signal processing unit that processes an acceleration signal detected by the first detection element;
   a first filter that removes a noise from the signal processed by the acceleration signal processing unit;
   a second detection element that detects another physical quantity than acceleration;
   a first physical quantity signal processing unit that processes a physical quantity signal detected by the second detection element;
   a second filter that removes a noise from the signal processed by the first physical quantity signal processing unit;
   a signal component analysis unit that analyzes a frequency component of the signal processed by the acceleration signal processing unit, determines whether or not a physical quantity corresponding to a frequency split component representing a difference between a frequency in a drive direction of the second detection element and a frequency in a detection direction of the second detection element is applied, and, if determining that the physical quantity corresponding to the frequency split component is applied, outputs an output stop signal;
   a first output control unit that stops output of the signal output from the first filter when the output stop signal is output from the signal component analysis unit; and
   a second output control unit that stops output of the signal output from the second filter when the output stop signal is output from the signal component analysis unit.

2. The sensor module according to claim 1, wherein the first and the second output control units output flags representing that the signal output is stopped when the output stop signal is output from the signal component analysis unit.

3. The sensor module according to claim 1, wherein the physical quantity detected by the second detection element is an angular velocity.

4. The sensor module according to claim 1, wherein the acceleration signal processing unit, the first and the second filters, the signal component analysis unit, the first and the second output control units, and the first physical quantity signal processing unit are formed on one semiconductor chip.

5. The sensor module according to claim 1, further comprising:
   a third detection element that detects another physical quantity than acceleration;
   a second physical quantity signal processing unit that processes a physical quantity signal detected by the third detection element;
   a third filter that removes a noise from the signal processed by the second physical quantity signal processing unit; and
   a third output control unit that stops output of the signal output from the third filter when the output stop signal is output from the signal component analysis unit.

6. The sensor module according to claim 5, wherein the physical quantity detected by the second detection element is an angular velocity.

7. The sensor module according to claim 1, further comprising:
   a first semiconductor chip on which the acceleration signal processing unit, the first filter, the first output control unit, and the signal component analysis unit are formed; and
   a second semiconductor chip on which the first physical quantity signal processing unit, the second filter, and the second output control unit are formed,
   wherein the first semiconductor chip is connected to the second semiconductor chip by a bonding wire, and transmits the output stop signal output from the signal component analysis unit to the second output control unit via the bonding wire.

8. The sensor module according to claim 1, further comprising:
   a first semiconductor chip on which the acceleration signal processing unit, the first filter, and the first output control unit are formed; and
   a second semiconductor chip on which the first physical quantity signal processing unit, the second filter, the second output control unit, and the signal component analysis unit are formed,
   wherein the second semiconductor chip is connected to the first semiconductor chip by a bonding wire, and transmits the output stop signal output from the signal component analysis unit to the first output control unit via the bonding wire.

9. A sensor system characterized by comprising:
   a sensor module having a first detection element that detects acceleration from outside, an acceleration signal processing unit that processes an acceleration signal detected by the first detection element, a first filter that removes a noise from the signal processed by the acceleration signal processing unit, a second detection element that detects another physical quantity than acceleration, a first physical quantity signal processing unit that processes a physical quantity signal detected by the second detection element, and a second filter that removes a noise from the signal processed by the first physical quantity signal processing unit; and
   a processor that controls an actuator according to the signals output via the first and the second filters, wherein the processor has
- a signal component analysis unit that analyzes a frequency component of the signal processed by the acceleration signal processing unit, determines whether or not a physical quantity corresponding to a frequency split component representing a difference between a frequency in a drive direction of the second detection element and a frequency in a detection direction of the second detection element is applied, and, if determining that the physical quantity corresponding to the frequency split component is applied, outputs an output stop signal, and
- an internal state determination unit that makes a transition to a state in which the processor does not perform the control of the actuator when the stop signal is output from the signal component analysis unit.

10. The sensor system according to claim 9, wherein the physical quantity detected by the second detection element is an angular velocity.

11. The sensor system according to claim 9, wherein the sensor module further comprising:
- a third detection element that detects another physical quantity than acceleration;
- a second physical quantity signal processing unit that processes a physical quantity signal detected by the third detection element;
- a third filter that removes a noise from the signal processed by the second physical quantity signal processing unit; and
- a third output control unit that stops output of the signal output from the third filter when the output stop signal is output from the signal component analysis unit.

12. The sensor system according to claim 11, wherein the physical quantity detected by the second detection element is an angular velocity.

13. A sensor system characterized by comprising:
- a sensor module having a first detection element that detects acceleration from outside, an acceleration signal processing unit that processes an acceleration signal detected by the first detection element, a first filter that removes a noise from the signal processed by the acceleration signal processing unit, a second detection element that detects another physical quantity than acceleration, a first physical quantity signal processing unit that processes a physical quantity signal detected by the second detection element, and a second filter that removes a noise from the signal processed by the first physical quantity signal processing unit; and
- a processor that controls an actuator according to the signals output via the first and the second filters, wherein the processor has
- a signal component analysis unit that analyzes a frequency component of the signal output from the first filter, determines whether or not a physical quantity corresponding to a frequency split component representing a difference between a frequency in a drive direction of the second detection element and a frequency in a detection direction of the second detection element is applied, and, if determining that the physical quantity corresponding to the frequency split component is applied, outputs an output stop signal, and
- an internal state determination unit that makes a transition to a state in which the processor does not perform the control of the actuator when the stop signal is output from the signal component analysis unit.

14. The sensor system according to claim 13, wherein the physical quantity detected by the second detection element is an angular velocity.

15. The sensor system according to claim 13, wherein the sensor module further comprising:
- a third detection element that detects another physical quantity than acceleration;
- a second physical quantity signal processing unit that processes a physical quantity signal detected by the third detection element;
- a third filter that removes a noise from the signal processed by the second physical quantity signal processing unit; and
- a third output control unit that stops output of the signal output from the third filter when the output stop signal is output from the signal component analysis unit.

16. The sensor system according to claim 15, wherein the physical quantity detected by the second detection element is an angular velocity.

* * * * *